(12) United States Patent
Thompson

(10) Patent No.: US 10,520,113 B1
(45) Date of Patent: Dec. 31, 2019

(54) THREADED ROD LOCKING AND RATCHETING DEVICE AND METHOD OF MAKING

(71) Applicant: William J. Thompson, Las Vegas, NV (US)

(72) Inventor: William J. Thompson, Las Vegas, NV (US)

( * ) Notice: Subject to any disclaimer, the term of this patent is extended or adjusted under 35 U.S.C. 154(b) by 0 days.

(21) Appl. No.: 16/216,130

(22) Filed: Dec. 11, 2018

Related U.S. Application Data

(60) Provisional application No. 62/764,790, filed on Aug. 17, 2018.

(51) Int. Cl.
| | |
|---|---|
| *F16B 2/06* | (2006.01) |
| *F16L 3/20* | (2006.01) |
| *F16L 3/22* | (2006.01) |
| *F16M 13/02* | (2006.01) |
| *F16B 39/10* | (2006.01) |

(52) U.S. Cl.
CPC ...... *F16L 3/20* (2013.01); *F16B 2/06* (2013.01); *F16B 2/065* (2013.01); *F16B 39/10* (2013.01); *F16L 3/22* (2013.01); *F16M 13/027* (2013.01)

(58) Field of Classification Search
CPC .. F16B 2/06; F16B 2/065; F16B 21/06; F16B 35/00; F16B 37/0821; F16B 37/0835; F16B 37/0842; F16B 37/0857; F16B 37/0864; F16B 39/10; F16L 3/20; F16L 3/22; F16M 13/027; B60P 7/0807; B60P 7/0815
USPC ................... 411/383, 432, 433; 410/104, 106
See application file for complete search history.

(56) References Cited

U.S. PATENT DOCUMENTS

| | | | |
|---|---|---|---|
| 422,361 A | 3/1890 | Alton | |
| 856,436 A | 6/1907 | Walden | |
| 2,218,319 A | 6/1939 | Pfauser | |
| 2,671,482 A | 3/1954 | Gordon | |
| 4,693,656 A | 9/1987 | Guthrie | |
| 5,154,385 A * | 10/1992 | Lindberg | ............. A47B 57/562 248/225.11 |
| 5,199,675 A | 4/1993 | DeGuchi | |
| 5,217,213 A | 6/1993 | Lii | |

(Continued)

FOREIGN PATENT DOCUMENTS

WO  WO 2014/037624  3/2014

OTHER PUBLICATIONS

PCT U.S. Searching Authority, International Search Report and the Written Opinion of the International Searching Authority, PCT/US2019/044094, dated Oct. 8, 2019, 12 pages.

*Primary Examiner* — Roberta S Delisle

(57) ABSTRACT

Trapeze system for suspending utilities from ceilings by threaded rod utilizing a rod locking and ratcheting device having a housing and a locking control lever for adjustably attaching a trapeze structure to the threaded rod suspension. The rod locking and ratcheting device quickly attaches to the trapeze structure by a channel tab that fastens the rod locking and ratcheting device to the trapeze. The rod locking and ratcheting device has a thumb actuated locking control lever that moves in the housing to engage or disengage a screw threaded portion on the locking control lever with threads on a threaded rod inside the housing of the locking and ratcheting device. The parts of the locking and ratcheting device are cold formed from 12 to 20 gauge steel.

15 Claims, 8 Drawing Sheets

(56) References Cited

U.S. PATENT DOCUMENTS

| | | | | |
|---|---|---|---|---|
| 5,271,586 | A * | 12/1993 | Schmidt | F16L 3/24 |
| | | | | 248/58 |
| 5,704,571 | A * | 1/1998 | Vargo | F16L 3/24 |
| | | | | 248/58 |
| 6,050,766 | A * | 4/2000 | Kies | F16B 37/0892 |
| | | | | 411/433 |
| 6,290,426 | B1 * | 9/2001 | van Gijsel | F16B 37/045 |
| | | | | 403/374.3 |
| 7,070,374 | B2 * | 7/2006 | Womack | B60P 7/0815 |
| | | | | 410/104 |
| 7,410,141 | B2 * | 8/2008 | Hartwick | F16B 2/065 |
| | | | | 248/317 |
| 7,976,257 | B2 * | 7/2011 | Kufner | F16B 5/02 |
| | | | | 411/84 |
| 8,257,004 | B2 | 9/2012 | Smith | |
| 8,696,286 | B1 | 4/2014 | Martin | |
| 8,998,155 | B2 | 4/2015 | Oh | |
| 9,683,590 | B2 * | 6/2017 | Zhang | F16B 7/0433 |
| 2011/0100434 | A1 * | 5/2011 | Van Walraven | F24S 25/636 |
| | | | | 136/251 |
| 2011/0192941 | A1 * | 8/2011 | Lalancette | F16L 3/04 |
| | | | | 248/70 |

* cited by examiner

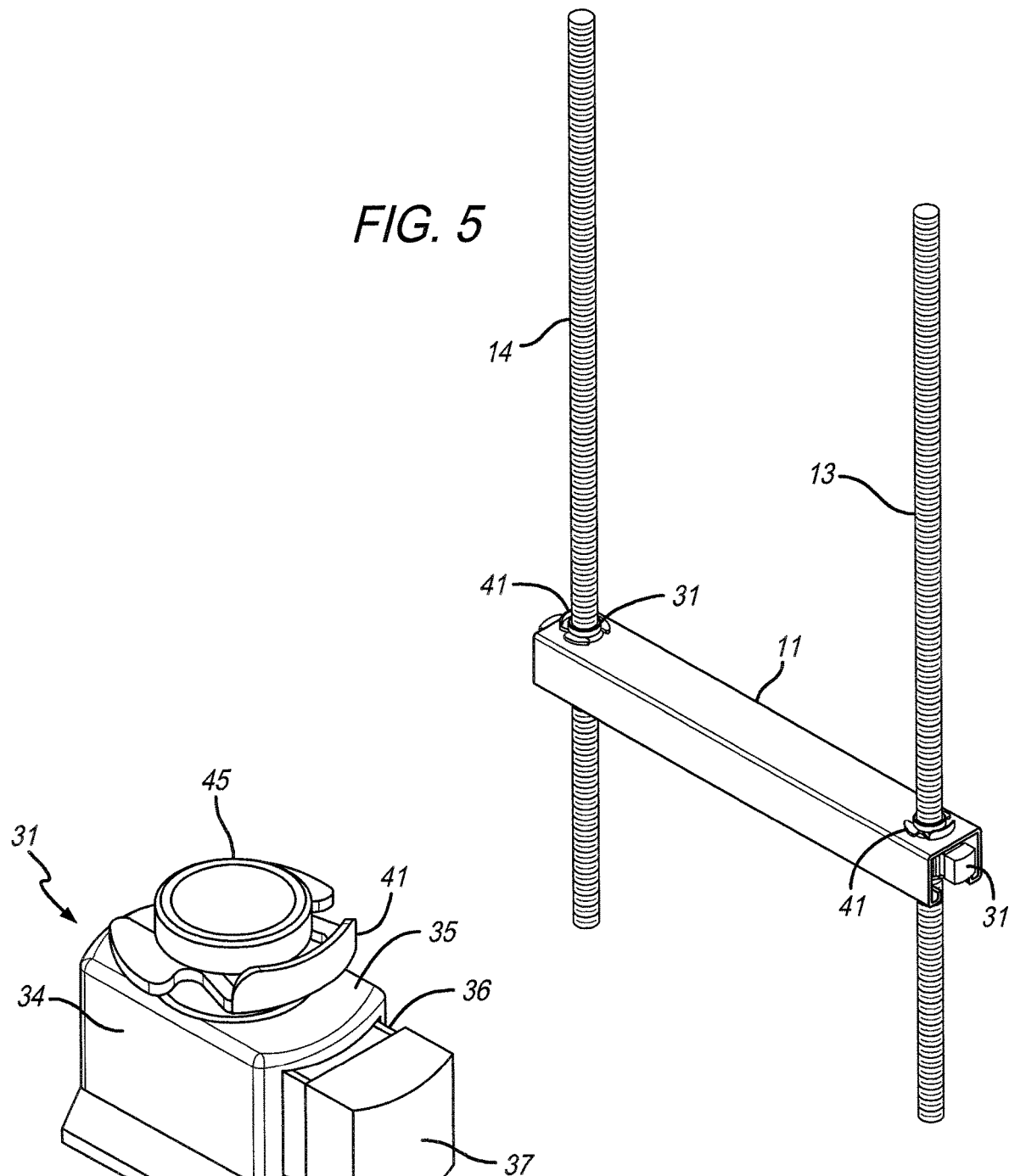

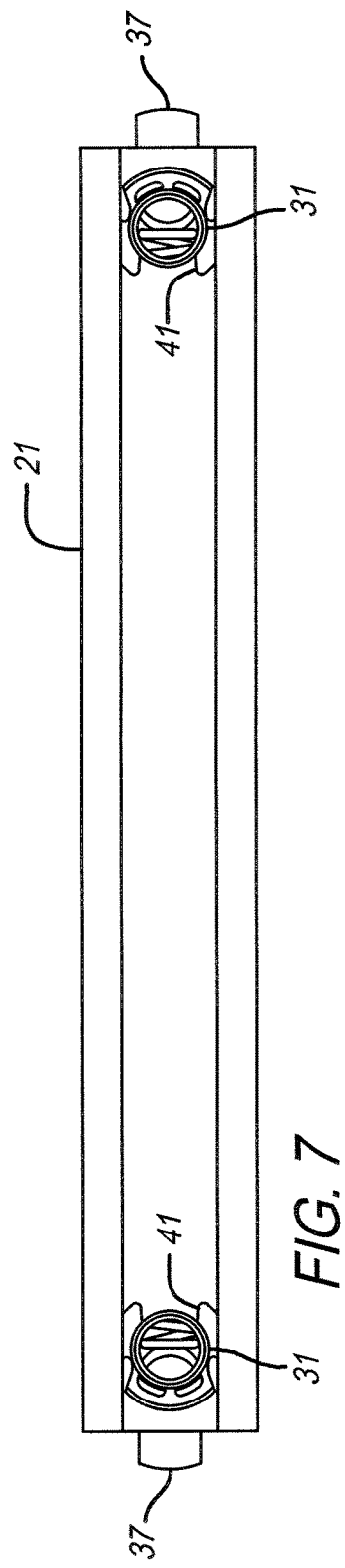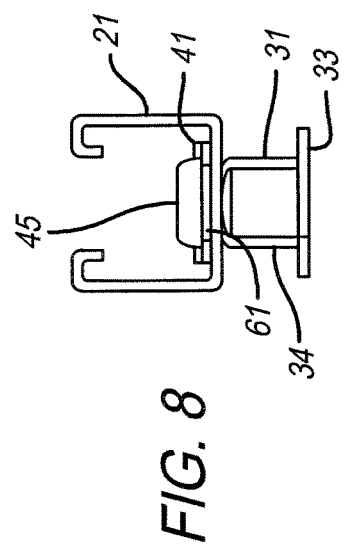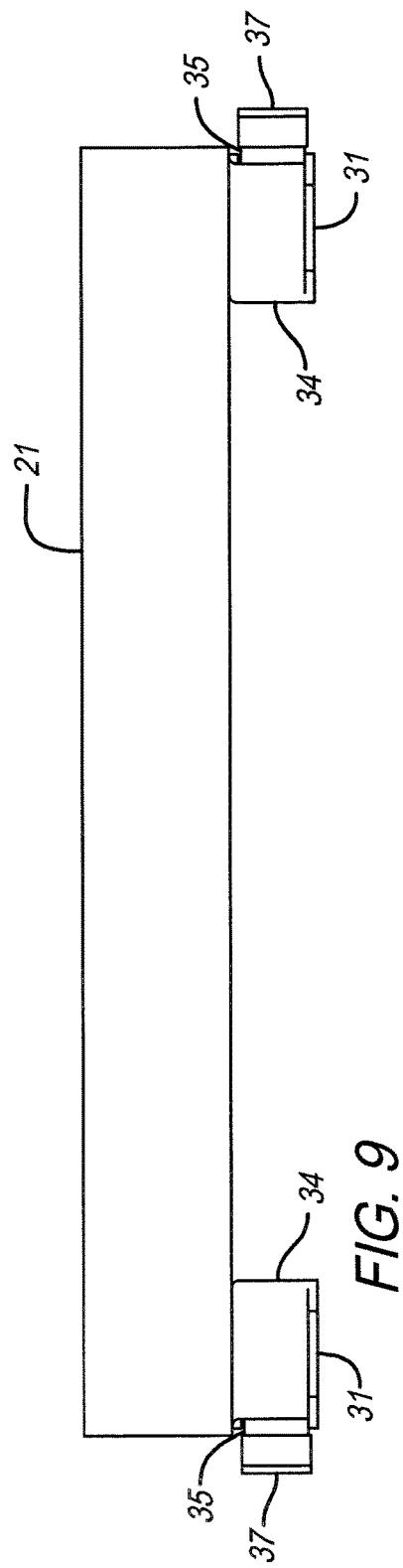

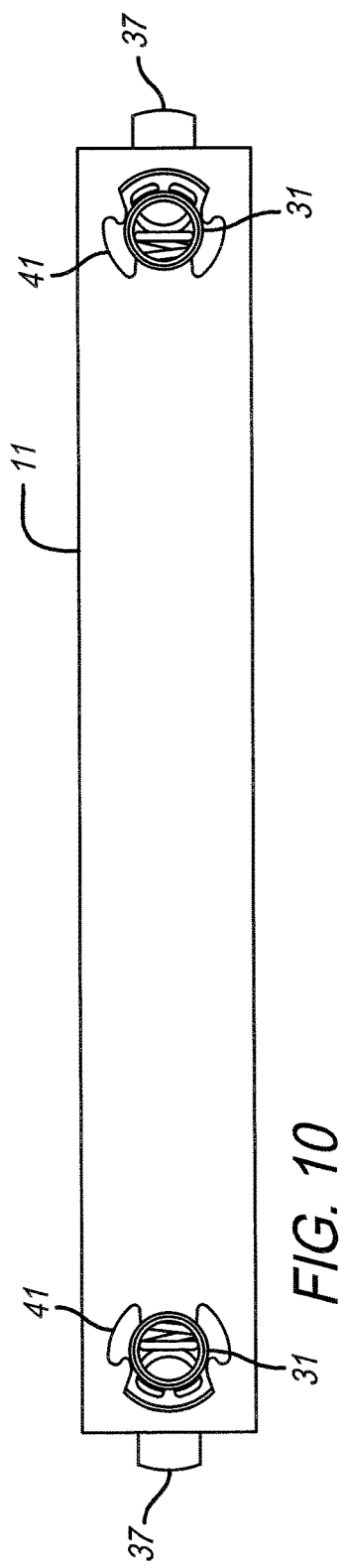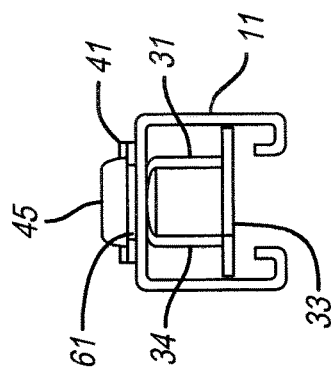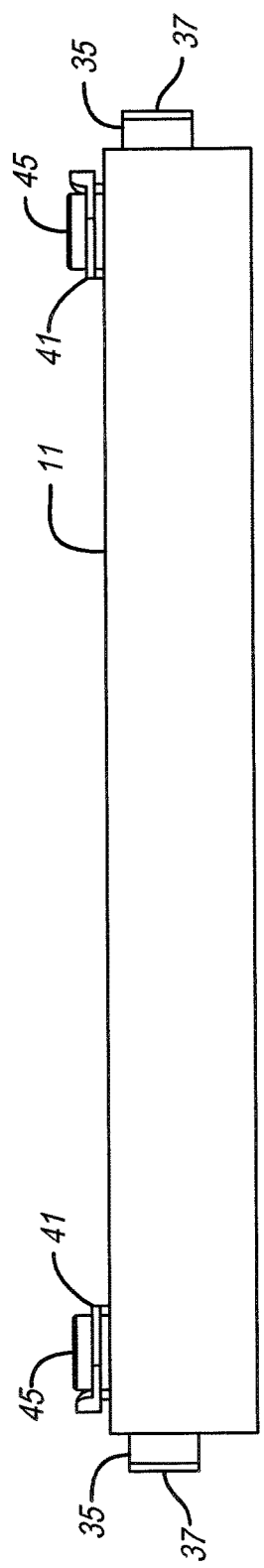
FIG. 10
FIG. 11
FIG. 12

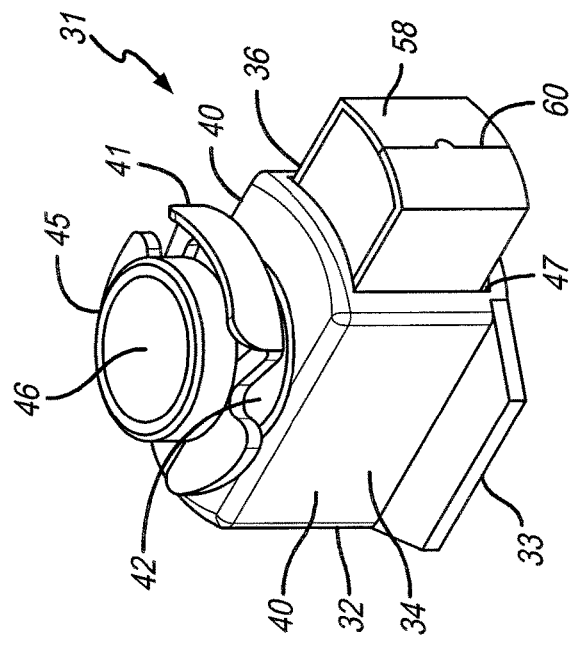
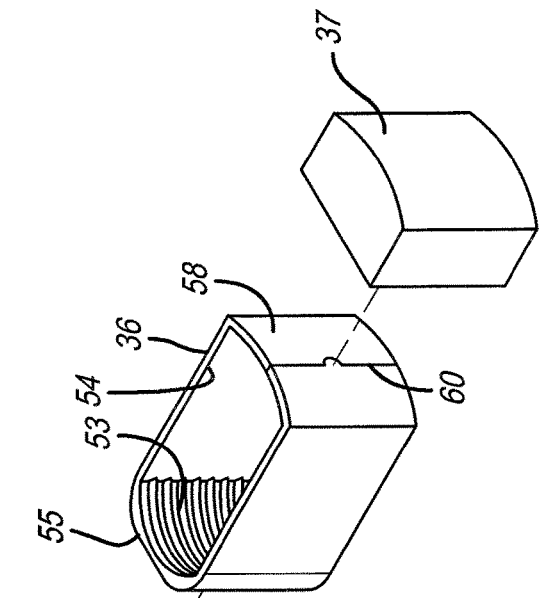
FIG. 13
FIG. 14

THREADED ROD LOCKING AND RATCHETING DEVICE AND METHOD OF MAKING

CROSS REFERENCE TO RELATED APPLICATIONS

This application claims the benefit of provisional U.S. application Ser. No. 62/764,790 filed Aug. 17, 2018 entitled "Threaded Rod Gripping Connection," the entirety of which is incorporated herein by reference.

BACKGROUND OF THE INVENTION

1. Field of the Invention

The present invention is in the field of trapeze devices for suspending utilities from ceilings by threaded rods.

2. Description of Related Art

FIGS. 1, 2 and 3 illustrate standard trapeze arrangements, to support overhead utilities using strut channels 11 and 21, commonly referred to in the industry as "struts". These struts are used in the construction and electrical industries for structural support and for supporting wiring, plumbing or mechanical components such as air conditioning or ventilating systems 17 in an overhead suspension.

The struts 11, 21 are usually formed from a 12-gauge metal sheet folded over into an open channel with inwards curving lips that provide additional stiffness and act as an attachment for mounting clamps 19. The struts usually have holes in the base to facilitate connection of the strut to an underlying structure or to threaded rods 13 and 14, usually suspended from a ceiling, for example.

The advantage to using struts in construction is that they provide many options for rapidly and easily connecting different lengths together, as well as connecting utilities 17 to the strut channels 11, 12, utilizing various specialized clamps 19 and bolts 29. The struts can be assembled with a minimum of tools and only moderately-trained labor. This reduces cost in many applications. A strut channel installation can also be modified or added to relatively easily if needed.

The record number of new and renovation construction projects currently in progress in the United States has created a shortfall of skilled job site tradesmen. This problem is projected to increase in the coming years. Offsite fabrication of suspension systems for supporting utilities constructed from struts for quick attachment to an overhead ceiling structure have therefore become a viable alternative. The only present alternative for the use of struts is custom fabrication using steel bar stock and other commodity components which require welding or extensive drilling and bolting. This approach has none of the advantages of a strut and has a high labor cost.

A typical strut channel forms a box of 1⅝×1⅝ inches. A strut channel with its open face is used with its open face down as shown in FIG. 11 or with its open face up, as shown in FIG. 8.

The material used to form a typical strut is a 12-gauge (0.1046 inch) or 14-gauge (0.0747 inch) thick steel metal sheet. The strut can come with different hole patterns for mounting to supports or solid, with no holes pre-drilled, requiring holes to be drilled on-site. Besides using single struts, two struts may be fastened or welded together back-to-back as shown in FIG. 3 and FIG. 4, illustrating face up strut 11 and face down strut 21 fastened together. Additional shapes may also be manufactured, including three or four struts, connected together in various patterns.

Although the strut is normally made of sheet steel with a zinc coating or other rust-resistant finish, it can also be manufactured from stainless steel for use where rusting might become a problem, such as outdoors or in facilities with corrosive materials. Struts may also be manufactured from an aluminum alloy when weight is an issue, or from fiberglass for very corrosive environments.

The inward-facing lips on the open face of the strut 11, 21 are used to connect to clamps 19 which hold utilities 17 to the strut. Special nuts 29 and 15 connect to the strut to suspended threaded rods 13 and 14, for example, suspending the strut from an overhead ceiling structure. The clamps 19 connected to the inward-facing lips on the strut 11, 21 are used to hold pipes or wire on the struts 11, 21. Threaded rods 13, 14 are connected to the struts 11 and 21, for example, by special nuts 15 and 29. As illustrated in FIGS. 1-3, the struts support a variety of loads required in commercial buildings, such as pipes, electrical and data wire, or mechanical systems, such as ventilation systems, air conditioning systems and other mechanical systems.

FIGS. 1, 2 and 3 illustrate standard strut assemblies. FIG. 1 shows a face up strut 11. The electrical or air conditioning utilities 17 are typically fastened to the strut 11 by special brackets or clamp 19. The strut 11 is suspended from an overhead support like a ceiling (not shown) by threaded rods 13 and 14 which are typically fastened to the strut 11 by nuts 15 and 29 on each threaded rod. Typically, such a trapeze structure is assembled in the field, requiring considerable labor. The utilities are mounted on the suspended strut, as needed, after it is attached to the ceiling.

An alternative support trapeze is shown in FIG. 2 wherein the face down strut 21 uses the special brackets or clamps 19 to support the utilities 17. This kind of system allows for easy connection of additional utilities after the trapeze assembly has been mounted to a ceiling.

FIG. 3 illustrates a trapeze structure wherein two struts, a face up strut 11 and a face down strut 21, are connected back-to-back so that utilities 17 can be supported by the face up strut 11, and by the brackets or clamps 19 on the face down strut 21.

Because of pricing pressures and the shortfall of skilled job site tradesmen, pre-fabricated, sub-assembled parts are being used in the field. This minimizes the requirement for in-the-field installers and reduces labor costs. The prior art systems shown in FIGS. 1, 2 and 3 require that installers need to rotate the threaded rod 13 or 14, or the nuts 15 and 29 on the threaded rod during installation. The threaded rod is typically part of the pre-fabricated sub-assembly. All of the conventional fastening mechanisms, such as beam clamps, conventional anchor bolts and conventional strut nuts, require that the threaded rod must be rotated into internal threads on the mating parts of the beam clamps, anchor bolts and strut nuts.

U.S. Pat. No. 8,998,155, granted Apr. 7, 2015 for "Quick Threaded Rod Locking Devices and Method," is directed to a threaded rod hanger that has a quick lock plunger mechanism within a tapered bore in a housing, utilizing a spring within the housing to press multiple plunger pieces toward the narrow end of a tapered bore in the housing. The moving plunger pieces have internally-threaded surfaces that engage the threads on a threaded rod that is inserted into the bore between the plunger pieces. Once the threaded rod has been inserted between the plunger pieces and released, the plunger pieces are pushed towards the narrow end of the bore causing them to press inward to engage the external threads of the threaded rod. While this threaded rod locking device allows for quick connection of a strut to a threaded rod, any adjustment of the strut on the rod necessarily requires that the threaded rod must be rotated within the locking device in order to adjust it on the rod. Furthermore, the rod locking device is fastened to the strut by a typical nut which needs to be threaded onto the externally-threaded housing, in order to fasten the rod locking device to a strut.

The structure disclosed in U.S. Pat. No. 8,998,155 fails to consider the problem of quick field adjustment after assembly. Furthermore, the tapered plunger pieces having internally-threaded surfaces for engaging the threaded rod require a manufacturing process which results in increased manufacturing cost.

Quick-adjusting nuts have been known and used in clamping mechanisms, for example, as shown in U.S. 856,436 granted Jun. 11, 1907 for a ratchet clamp; U.S. Pat. No. 2,671,482 granted Mar. 9, 1954 for a quick-acting screw and ratchet clamping device; and U.S. Pat. No. 4,693,656 granted Sep. 15, 1987 for a quick adjusting nut.

Adjustable screw nuts have also been devised, such as in U.S. 422,361 granted Mar. 4, 1890 for a screw nut, and U.S. Pat. No. 2,218,319 granted Oct. 15, 1940 for an adjustable extension.

These prior art quick-adjusting nut mechanisms have all been directed to lightweight load applications. These lightweight load structures do not comply with building code load requirements for strut support structures. Typical load requirements for trapeze strut structures is 50 lbs. per foot. A typical length for a strut used for overhead support of utilities, is eight feet. This maximum span is usually suspended by two ⅜ inch or ½ inch diameter threaded rods. The prior art quick-adjusting nut mechanisms in the above-noted patents are not designed for and would be unable to support such a weight, let alone provide the required safety factor. The present invention, contrary to the prior art structures, exceeds all building code load requirements while also providing the convenience of both a locking and a ratcheting function.

SUMMARY OF THE INVENTION

A threaded rod locking and ratcheting device for adjustably attaching struts to threaded rods, typically suspended from a ceiling, quickly attaches the strut to the rod with a load rating that surpasses applicable building code requirements. A channel tab quickly connects and holds the threaded rod locking and ratcheting device to the strut. Quick adjustment along the threaded rod, before and after locking the threaded rod to the strut, is achieved by a locking control lever that is thumb activated to move in a housing to engage or disengage a screw threaded portion on the locking control lever, with the threads on a threaded rod when the threaded rod is placed into the rod locking and ratcheting device. Once the locking control lever engages the threads on the rod, the rod is locked to the strut. Pushing the locking control lever into the housing with the required force unlocks the rod, allowing adjustment of the locking and ratcheting device and strut on the rod. Releasing the locking control lever again locks the locking and ratcheting device and strut to the rod. The rod locking and ratcheting device is made by cold forming a housing with apertures for passage of a threaded rod, and cold forming a locking control lever that moves within the housing to grasp the threaded rod by a threaded impression stamped into the locking control lever. A spring in the housing forces the locking control lever with the threaded impression against threads on the portion of the rod located in the housing.

BRIEF DESCRIPTION OF THE DRAWINGS

The exact nature of this invention, as well as its objects and advantages, can become readily apparent from consideration of the following specification related to the accompanying sheets of drawing, in which like reference numerals designate like parts throughout the figures thereof, and wherein:

FIG. 5 is a perspective of a strut attached to a pair of threaded rods by threaded rod locking and ratcheting devices according to the present invention.

FIG. 6 is a perspective of a threaded rod locking and ratcheting device according to the present invention.

FIG. 7 is a top plane view of a strut with the threaded rod locking and ratcheting devices attached to the strut.

FIG. 8 is an end plan view of the threaded rod locking and ratcheting device and strut shown in FIG. 7.

FIG. 9 is a side view of the assembly shown in FIG. 7.

FIG. 10 is a top plan view of a strut with the threaded rod locking and ratcheting devices attached to the strut.

FIG. 11 is an end plan view of the assembly shown in FIG. 10.

FIG. 12 is a side plan view of the assembly shown in FIG. 10.

FIG. 13 is a perspective of an assembled thread rod locking and ratcheting device.

FIG. 14 is an assembly drawing of the threaded rod locking and ratcheting device.

DETAILED DESCRIPTION OF THE PREFERRED EMBODIMENTS

Figure 1:
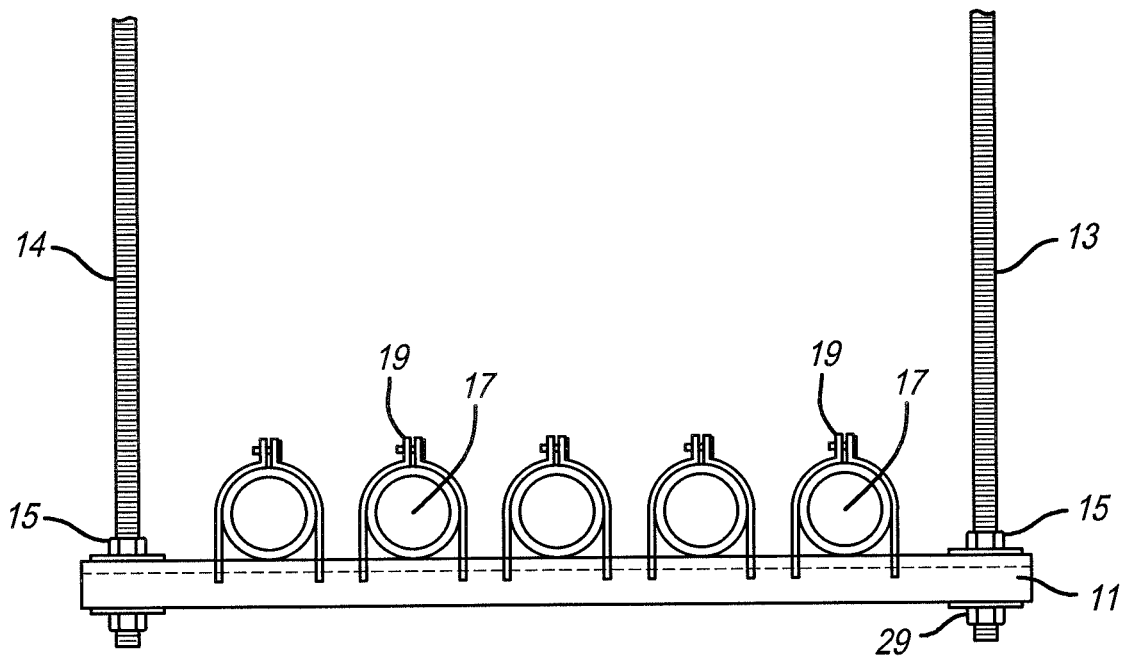
FIG. 1 is a plan side view of a typical trapeze overhead utility support structure using a strut platform.
Figure 2:
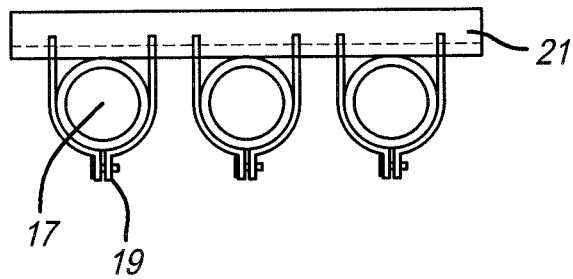
FIG. 2 is a plan side view of an alternate configuration of a typical trapeze overhead support structure.
Figure 3:
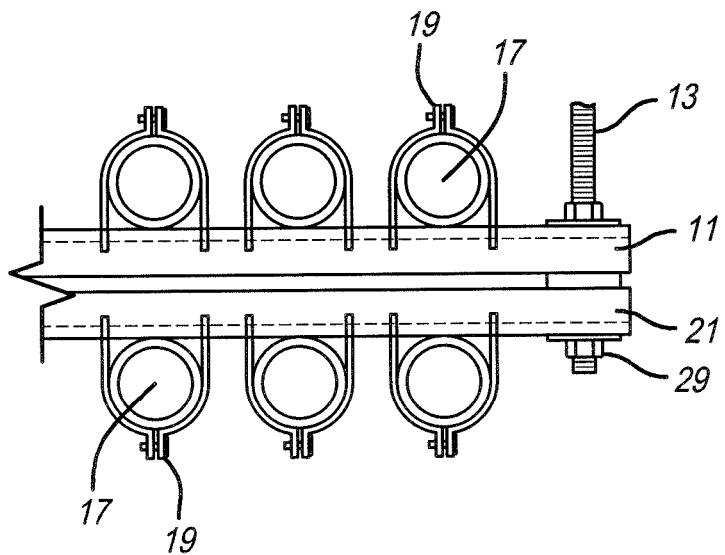
FIG. 3 is a plan side view of yet another alternate arrangement of an overhead trapeze utility support structure.
Figure 4:
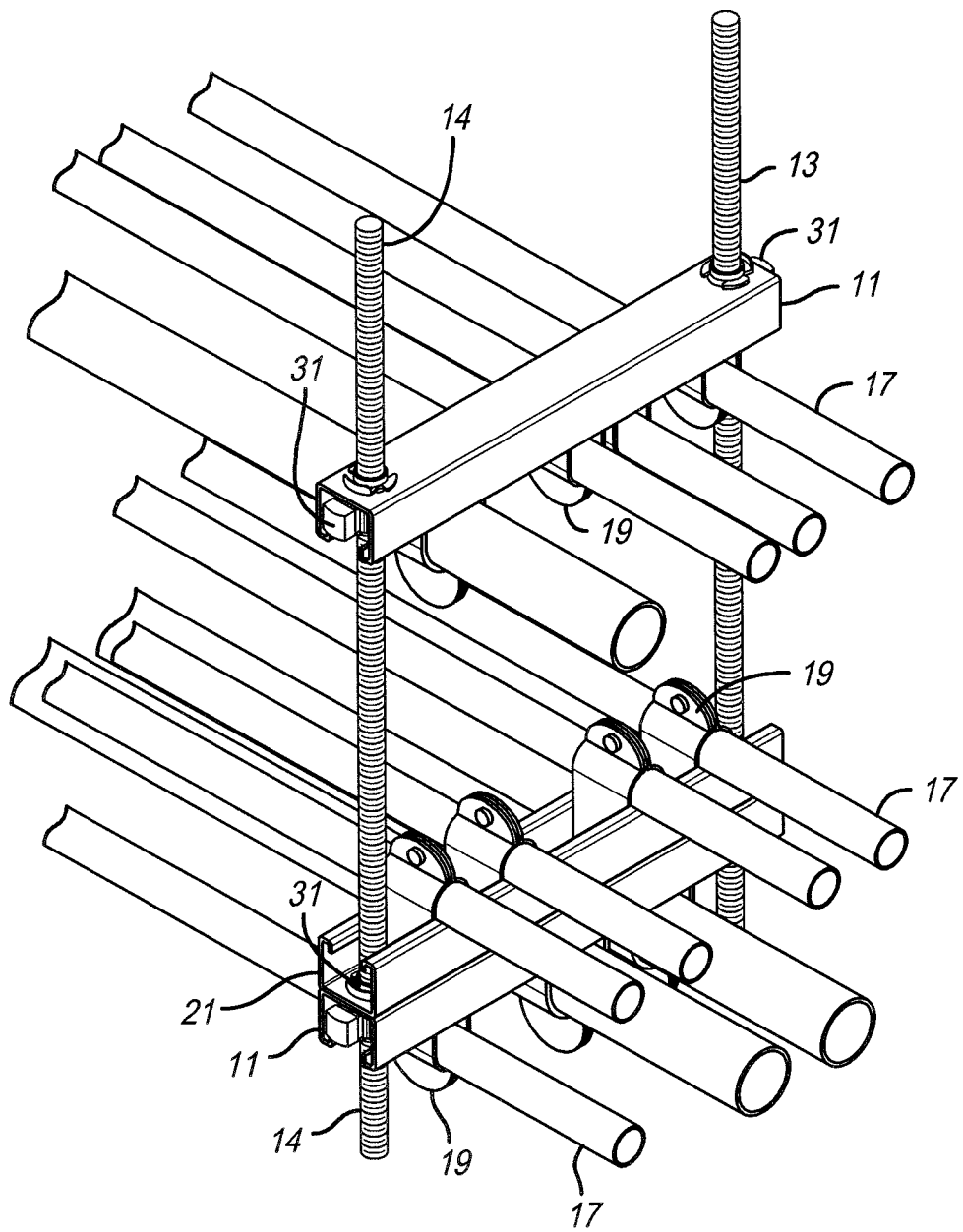
FIG. 4 is a perspective of an overhead trapeze utility support structure utilizing a threaded rod locking and ratcheting device according to the present invention.

FIG. 4 illustrates of how the threaded rod locking and ratcheting device of the present invention can be used in an exemplary arrangement of struts 11 and 21 for supporting various utilities 17. In the example of FIG. 4, a face down strut 11 is attached to a pair of threaded rods 13, 14 by two threaded rod locking and ratcheting devices 31. Strut 11 supports the utilities 17 in a hanging arrangement by clamps 19. The bottom strut arrangement is a face up strut 21 back-to-back with a face down strut 11, attached to the rods 13 and 14 by another pair of thread rod locking and ratcheting devices 31. The face up strut 21 supports the utilities 17 and holds them to the strut by clamps 19. The face down strut 11 supports the utilities 17 in a hanging arrangement by clamps 19.

As FIG. 4 illustrates, the threaded rod locking and ratcheting devices 31 can be mounted to a strut that is either open face up or open face down. FIG. 5 illustrates a strut arrangement which can be supplied to a building site preassembled. The assembly includes a face down strut 11, a pair of rods 13 and 14 locked to the strut 11 by a pair of rod locking and ratcheting devices 31 at the ends of the strut 11.

The rod locking and ratcheting device 31 of the present invention illustrated in FIG. 6 has a body 34 having a floor 33 and a ceiling 36 with a chimney 45 having an aperture therethrough. A locking control lever 36 is located within the body 34 of the thread rod locking and ratcheting device 31. A cover 37 and the end of the thumb actuating lever 36 extends out of the body 34 of the thread rod locking and ratcheting device 31. An attachment clip 41 attaches to the chimney 45 on the ceiling 35 of the rod locking and ratcheting device 31, after the chimney 45 passes through an aperture in a strut 11, as shown in FIG. 5.

FIGS. 7, 8 and 9 illustrate how the rod locking and ratcheting device is connected to face up strut 21. The rod locking and ratcheting device 31 is attached to the solid side of strut 21. As illustrated, the chimney 45 passes through an aperture in the strut to the inside of the strut, as illustrated in FIG. 8. The attachment clip 41 slides into a slot 61 that surrounds chimney 45. No further attachment mechanism is necessary. No threaded nuts, no clamps. The body 34 of the rod locking and ratcheting device 31 is on the outside of face up strut 21. The locking control lever 35, with its contact pad 37, extends out of the housing 34 of the rod locking and ratcheting device 31. Pushing the contact pad 37 into the housing 34 causes disengagement of the locking feature of the rod locking and ratcheting device 31, as will be explained hereinafter.

The rod locking and ratcheting device 31 also conveniently attaches to a face down strut 11 as shown in FIGS. 10, 11 and 12. The floor 33 of the housing 34 of the rod locking and ratcheting device 31 is sized to fit within the width of channel 11, as shown in FIG. 11. The rod locking and ratcheting device, its housing body and floor is inserted into the inside of the face down strut 11 until the chimney 45 passes through an aperture in the strut 11. An attachment clip 41 is slipped around the chimney 45 to hold the housing body of the rod locking and ratcheting device to the inside surface of strut 11, as shown in FIG. 11. The contact pad 37 and part of the locking control lever 35 extend out the end of down face channel 11. Pushing control pad 37 into the housing 34 of will release the locking function of the rod locking and ratcheting device 31.

FIG. 13 illustrates the threaded rod locking and ratcheting device 31 assembled. FIG. 14 illustrates the threaded rod locking and ratcheting device 31 exploded in an assembly drawing. The rod locking and ratcheting device 31 has a housing 34 made by cold forming steel so that it has two parallel long walls 40, a closed back wall 32, an open front wall 47 and a ceiling 35 with a chimney 45. A separate floor 33 attaches to the long walls 40 to create an internal space with one open end. The chimney 45 has a slot 61 around its circumference and a bore 46 passing through the chimney and the top 35, into the interior space of the rod locking and ratcheting device. A fastening clip 41 slides into the slot 61 on the chimney 45 to hold the chimney and the housing 34 to a strut. The interior of the housing 34 contains a spring 51 located between closed back wall 32 and a first closed end 55 of the locking control lever 36. Stamped-in screw threads 53 are located at the first closed end. The screw threads 53 are only located at the interim of the first end 55 of the locking control lever. The rest of the locking control lever 36 is a smooth wall portion 54 to the closed second end 58 of locking control lever 36. The second closed end 58 is formed by bending the ends to meet at a common plane. The locking control lever 36 thus forms a closed oval loop.

An aperture 57 in the floor 33 of locking and ratcheting device 31 (FIG. 15) allows for passage of a threaded rod through aperture 57 in the floor and the bore 46 in the chimney 45. The locking control lever 36 moves within the open interior of housing 34, parallel to the long walls 40 of housing 34 against the spring 51, as urged by pressure on the control pad 37 and closed second end 58. Locking control lever 36 moves back and forth around the aperture 57 in the floor 33 of the housing 34 of the rod locking and ratcheting device 31.

Figure 15:
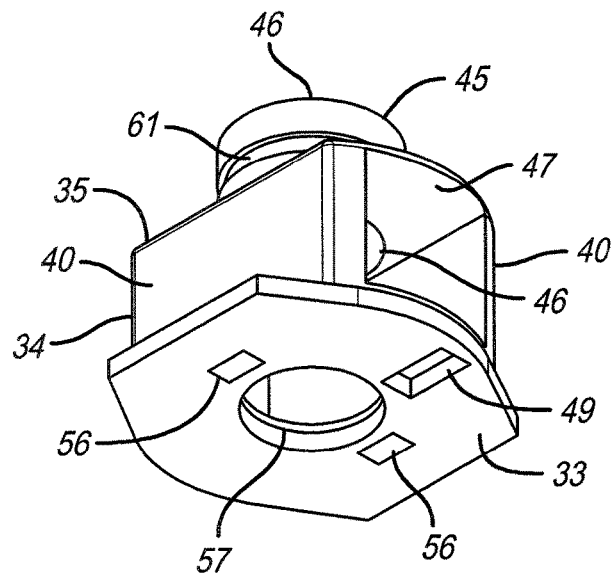
FIG. 15 is a bottom perspective of a housing for the threaded rod locking and ratcheting device.
Figure 16:
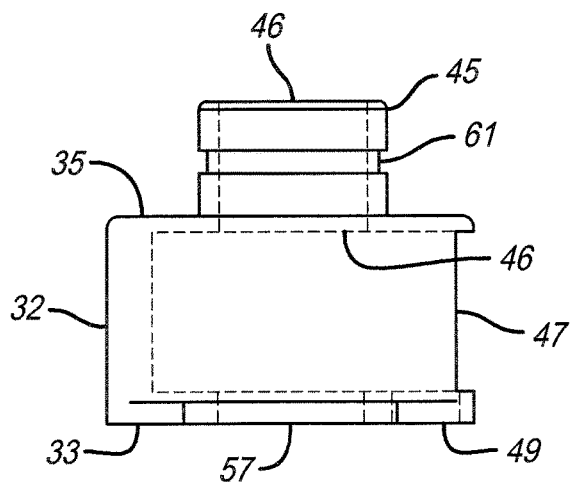
FIG. 16 is a plan side view of the housing for the threaded rod locking and ratcheting device of FIG. 15.
Figure 17:
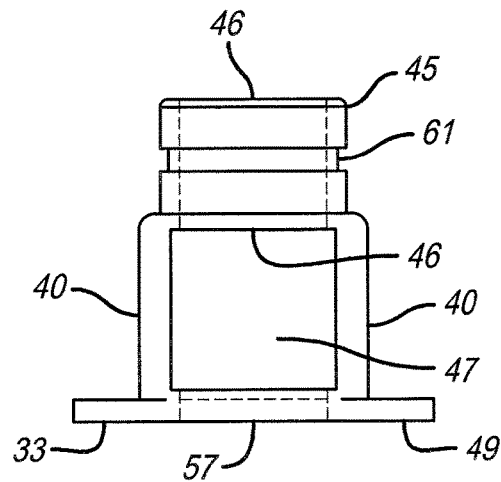
FIG. 17 is a plan end view of the open end of the housing for the threaded rod locking and ratcheting device of FIG. 15.

FIG. 15 illustrates how the floor 33 of housing 34 is attached to the long walls 40 of the housing 34 on the locking and ratcheting device 31. The floor 33, which has an aperture 57 at the symmetrical center, is attached to both long walls 40 by either a crimp or weld spot 56. The floor 33 includes a slot 49 parallel to one of the long walls 40. The housing 34 is made up of two pieces. The floor 33 is attached to the walls 40, roof and chimney of the upper structure. The long walls 40, closed end 32, open end 47, roof 35 and chimney 45 are the upper structure.

The locking control lever 36 moves into the interior of the housing 34, back and forth around the aperture 57 in floor 33 and the bore 46 in the chimney 45. The locking control lever 36 is formed in an elongated loop with a first closed end 55 and a second closed end 58. The loop structure of the locking control lever 36 is formed out of a single strip of 16 to 20 gauge steel strip stock. A screw-threaded portion 53 is stamped into the mid-section of the steel strip stock before it is bent into a closed-loop shape, as illustrated in FIGS. 18 and 19.

Figure 18:
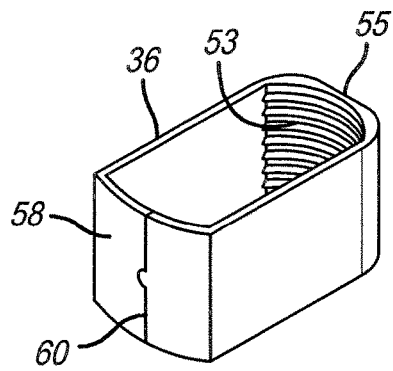
FIG. 18 is a perspective of the locking control lever that fits into the housing of the threaded rod locking and ratcheting device of FIG. 15.
Figure 19:
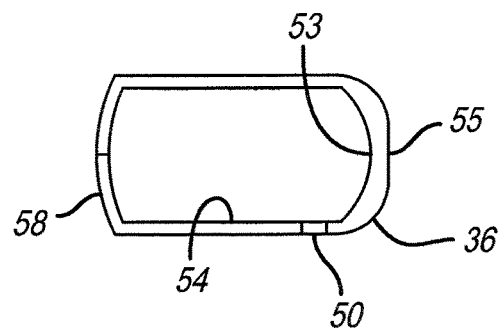
FIG. 19 is a top plan view of the control lever of FIG. 18.

FIG. 19 shows a bottom view of the locking control lever 36 of FIG. 18. A pin 50 extends from a bottom of the smooth wall portion 54 of the wall that makes up locking control lever 36. The pin 50 fits into slot 49 (FIG. 15) at the time the floor 33 is attached to the long walls 40 of housing 34. The locking control lever, as shown in FIG. 18, is inserted into the interior of housing 34 through open wall 46 before the floor 33 is attached to the long walls 40 of housing 34.

The ability of the rod locking and ratcheting device of the present invention to function as a fastener in commercial structures, exceeding the weight load capacity of traditional nut fasteners is truly surprising. The spring 51 of the rod locking and ratcheting device is designed to exert a spring pressure of 25 lbs. The spring 51 is preferably a coil spring. This pressure is sufficient to hold the screw threaded portion 53 in the first end 55 of the locking control lever 36 against the threads of a threaded rod in the rod locking and ratcheting device.

Figure 20:
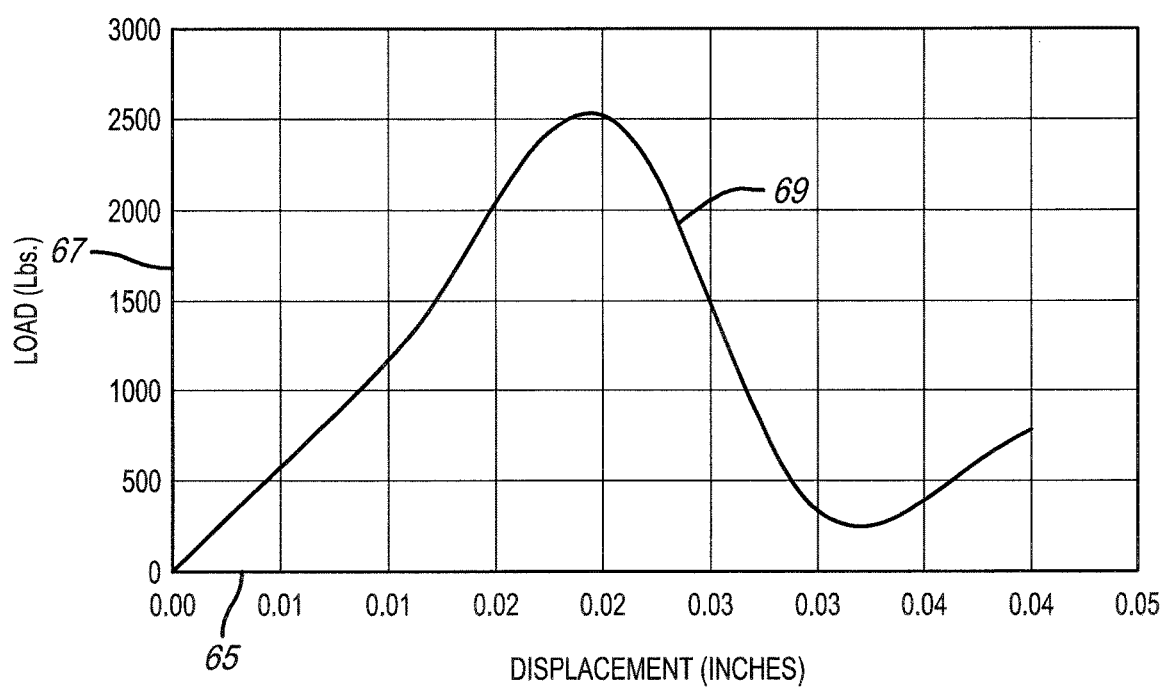
FIG. 20 is a graph illustrating the load-bearing capacity of a typical threaded rod locking and ratcheting device of the present invention.

The graph of FIG. 20 illustrates the results of a test of the holding power of the threaded rod locking and ratcheting device under an increasing load. The graph plots load in pounds along the Y axis 67 against displacement in inches along the X axis 65. The plot 69 shows the maximum load before what is considered a failure to be 2,500 lbs. The displacement in inches of the threaded rod in the rod locking and ratcheting device at 2,500 lbs. was 0.02 inches. This is an exceptionally high load-carrying capacity that far exceeds the requirements of commercial building codes. The load-carrying capacity of the present invention exceeds the safe working load by more than a 3:1 ratio.

The present invention provides a threaded rod locking and ratcheting device which is exceptionally strong under load, yielding only 0.02 inches under a 2,500 lb. load. The rod locking and ratcheting fastener locks the threaded rod to the strut even under an extremely high load, and also permits quick and easy disengagement before and after attachment, in case of adjustment requirements. Moreover, the rod locking and ratcheting device is relatively simple in construction and inexpensive to manufacture.

What is claimed is:

1. A threaded rod locking and ratcheting device comprising:
    a housing with two parallel long walls, one short wall, and one short open wall, a top with a chimney of a predetermined outside diameter, the chimney having a bore diameter predetermined to accommodate passage of a threaded rod, and a floor with an aperture having a diameter to accommodate passage of the threaded rod;
    a locking control lever formed in a loop having a closed first end inside the housing and a closed second end outside the housing extending through the short open wall, a smooth wall portion extending along an interior wall between the closed first end and the closed second end, a screw threaded portion on the interior wall at the first closed end; and
    a spring in the housing between the short wall and the closed first end of the control lever;
    whereby the spring urges the screw threaded portion of the locking control lever into engagement with threads of a threaded rod inserted in the locking device through the chimney or the floor aperture.

2. The locking and ratcheting device of claim 1 wherein the chimney of the housing top has a circumferential groove around the outside diameter at a predetermined distance from the housing top; and
    further comprises a channel attachment clip that fits into the groove to surround the outside diameter of the chimney by more than half of the diameter.

3. The locking and ratcheting device of claim 1 wherein the floor of the housing has a preselected size and shape, and is physically attached to the two long walls of the housing.

4. The locking and ratcheting device of claim 3 wherein the floor of the housing has a slot, parallel to the long walls of the housing along the inside of one of the long walls of the housing.

5. The locking and ratcheting device of claim 4 wherein the locking control lever includes a pin extending from a bottom of the smooth wall portion between the first end and second end for extending into the slot in the floor of the housing, the pin allowing the locking and control lever to travel into and out of the open end of the housing, while preventing disengagement from the housing.

6. The locking and ratcheting device of claim 1 wherein the spring is a compression spring.

7. A device for adjustably attaching threaded rods to a horizontal channel strut for supporting overhead utilities, the strut having a fixed length and width and mounting holes, suspended by threaded rods attached to a ceiling, each threaded rod passing through the mounting holes in the strut, the adjustably attaching device comprising:
    a housing with two parallel long walls, one short wall, and one short open wall, the short walls sized to fit within the width of the horizontal channel strut, a top with a chimney, the chimney having a predetermined outside diameter for passing through a mounting hole in the strut, and a bore diameter for passage of a threaded rod and a floor with an aperture sized for passage of the threaded rod;
    a locking control lever formed in a loop having a closed first end inside the housing, connected by walls extending through the short open wall to a closed second end outside the housing, a smooth wall portion extending along an interior wall between the first end and the second end, a screw threaded portion on the interior wall at the first closed end; and
    a spring in the housing between the short wall of the housing and the closed first end of the control lever;
    whereby the spring urges the screw threaded portion of the locking control lever into engagement with threads of a threaded rod in the attaching device.

8. The attaching device of claim 7 wherein the chimney of the housing top has a circumferential groove around the outside diameter at a predetermined distance from the housing top; and
    further comprises a channel attachment clip that fits into the groove to surround the chimney outside diameter of the chimney by more than half of the diameter.

9. The attaching device of claim 7 wherein the floor of the housing has a preselected size and shape, and is physically attached to the two long walls of the housing.

10. The attaching device of claim 9 wherein the floor of the housing has a slot, parallel to the long walls of the housing along the inside of one of the long walls of the housing.

11. The attaching device of claim 10 wherein the locking control lever includes a pin extending from a bottom of the smooth wall portion between the first end and second end for extending into the slot in the floor of the housing, the pin allowing the locking and control lever to travel into and out of the open end of the housing, while preventing disengagement from the housing.

12. The attaching device of claim 7 wherein the spring is a compression spring.

13. A method of making a threaded rod locking and ratcheting device, comprising:
    cold forging a housing having two parallel long walls, one short wall, and one open short wall, and a top with a chimney having a preselected outside diameter and bore;
    cold forming making a locking control lever from 16 to 20 gauge strip stock to a predetermined length and width, stamping a threaded impression into the center of the strip stock, bending the strip stock into a 180° bend at the threaded impression, and folding the ends of the strip stock to form a closed loop;
    inserting a spring into the housing at the short wall;
    inserting the locking control lever into the housing with the 180° bend contacting the spring; and
    attaching a floor, with an aperture therein having a predetermined diameter aligned with the bore in the chimney, to the two parallel long walls of the housing.

14. The method of making of claim 13 wherein the housing floor has a slot parallel to the long walls of the housing, along the inside of one of the long walls of the housing.

15. The method of making of claim 14 wherein the locking control lever includes a pin extending from the width of the strip stock for extending into the slot in the floor at the time of attaching the floor to the long walls of the housing.

* * * * *